May 27, 1952 A. J. BARRY ET AL Re. 23,502
COPOLYMERIC SILOXANES
Original Filed July 31, 1948
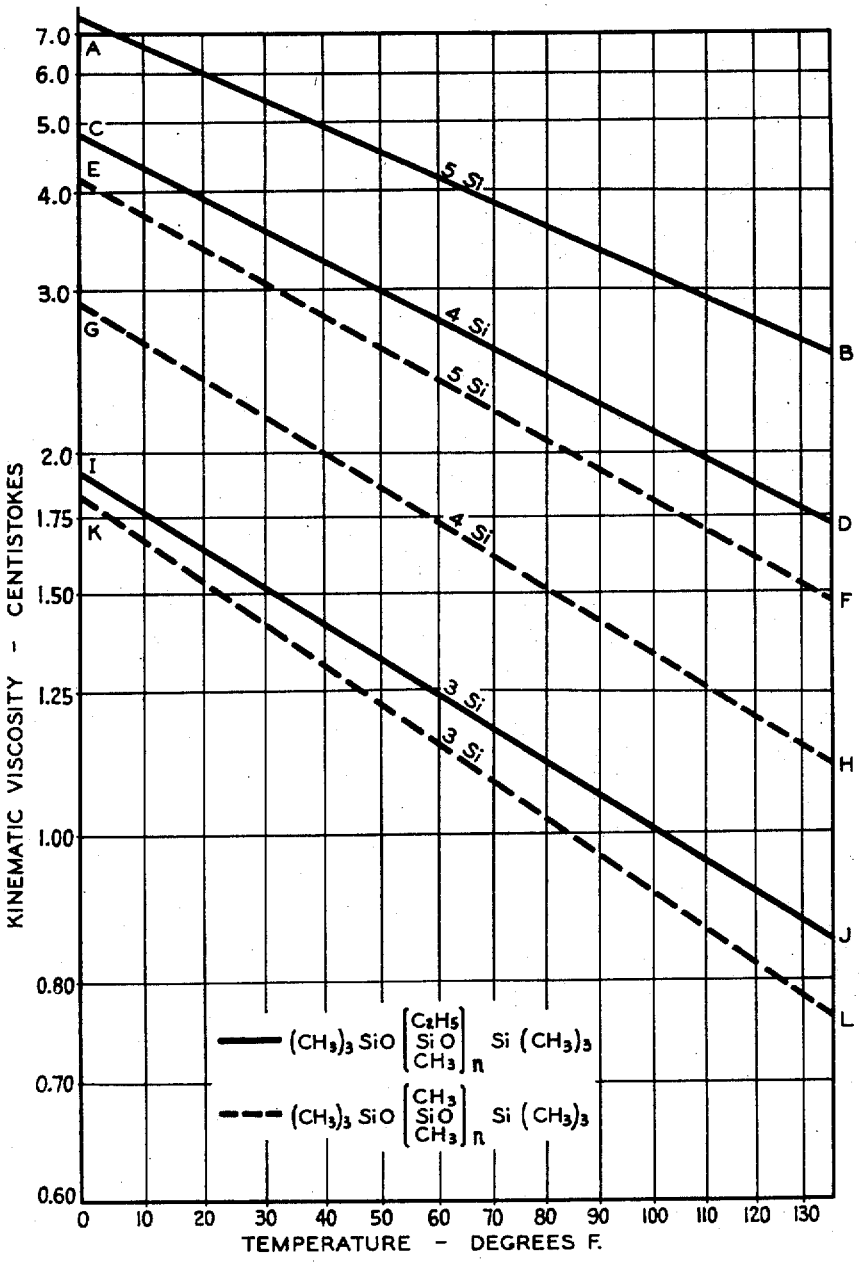
INVENTORS
ARTHUR J. BARRY
JOHN W. GILKEY
BY William Blackburn
ATTORNEY Reissued May 27, 1952 Re. 23,502

UNITED STATES PATENT OFFICE 23,502

COPOLYMERIC SILOXANES

Arthur J. Barry and John W. Gilkey, Midland, Mich., assignors to Dow Corning Corporation, Midland, Mich., a corporation of Michigan Original No. 2,495,362, dated January 24, 1950, Serial No. 41,823, July 31, 1948. Application for reissue December 29, 1951, Serial No. 264,108

5 Claims. (Cl. 260—448.2)

Matter enclosed in heavy brackets [ ] appears in the original patent but forms no part of this reissue specification; matter printed in italics indicates the additions made by reissue.

This invention relates to new compositions of matter comprising linear copolymeric siloxanes of the type $R_3SiO[C_2H_5CH_3SiO]_nSiR_3$.

Copolymeric siloxanes of the type $$(CH_3)_3SiO[(CH_3)_2SiO]_nSi(CH_3)_3$$

are known to the art. These materials are stable fluids possessing good temperature-viscosity behavior which renders them eminently adaptable for use as lubricants and damping media. However, the dimethylsiloxane trimethylsiloxane copolymeric fluids have freezing points in the neighborhood of —75° C. This limitation renders particularly the high polymers, unsuitable for use in the extreme temperatures encountered at high altitudes and in the Arctic.

It is an object of this invention to provide materials which possess good stability and temperature-viscosity behavior and at the same time, have freezing points below —120° C. Another object of this invention is to provide lubricants and damping media suitable for use on aircraft under any conditions encountered in nature. Other objects and advantages will be apparent from the following description.

This invention relates to copolymeric siloxanes of the type $$(CH_3)_2RSiO(C_2H_5CH_3SiO)_nSiR(CH_3)_2$$

where n has a positive value and R is a methyl or ethyl radical. These compounds may be in the form of distillable low molecular weight products in which n is an integer from 1 to 4 inclusive, or in the form of non-distillable polymeric mixtures in which n has an average value greater than four.

These copolymers may be prepared from hydrolyzable silanes of the type $(CH_3)_3SiX$, $C_2H_5(CH_3)_2SiX$ and $CH_3C_2H_5SiX_2$ where X is a halogen or alkoxy. Such silanes may be produced by any appropriate method. For example, they may be synthesized by the well known Grignard reaction. Alternatively, the ethylmethylsilanes may be prepared by reacting $CH_3HSiCl_2$ with ethylene under pressure to give $CH_3C_2H_5SiCl_2$. This method is more fully disclosed in the copending application of Arthur J. Barry et al., Serial Number 674,926, filed June 6, 1946, assigned to the Dow Chemical Company.

The hydrolysis of the silanes to give the copolymers of this invention may be carried out in two ways. The triorgano silane and the ethylmethylsilane may be mixed and cohydrolyzed and cocondensed by any of the methods known to the art. In such a process the reaction may be carried out either with or without a catalyst and in the presence or absence of a solvent. It is preferred that the hydrolysis and condensation be carried out at temperatures between 0° C. and 250° C. The triorganosilane and the ethylmethylsilane may be hydrolyzed separately and the hexaorganosiloxane and the ethylmethylsiloxane so obtained, which may be completely condensed, may be mixed and copolymerized by contacting them with an interaction catalyst such as a strong acid or an alkali metal hydroxide. In this method it is preferred that the temperature employed be between 80 and 200° C. A solvent may be used if desired.

The copolymers of this invention are linear in structure, and the molecules are composed of ethylmethylsiloxane chains end-blocked with trimethyl or ethyldimethyl silyl units. The lower members of both the homologous series may be separated from the reaction mixture by distillation.

The viscosity of the products obtained by cocondensing or interacting the triorganosilanes and the ethylmethylsilanes is readily controlled by regulating the molar ratio of triorgano to diorgano constituents. When the molar ratio of triorgano to diorgano silanes is high the viscosity of the copolymer product will be low. When this molar ratio is low the viscosity of the product will be high. Thus, it is possible to obtain copolymers of any desired viscosity.

The trimethylsiloxane — ethylmethylsiloxane and ethyldimethylsiloxane—ethylmethylsiloxane copolymers of this invention possess a combination of low freezing points and relatively small change in viscosity with temperature which renders them highly useful as low temperature lubricants and damping media. This combination of properties is both advantageous and unexpected.

As a comparison of the temperature-viscosity slopes of some trimethylsiloxane-ethylmethylsiloxane copolymers with trimethylsiloxane-dimethylsiloxane copolymers, recourse may be had to the accompanying drawing. The drawing is a graph of the kinematic viscosity in centistokes against the temperature in degrees F. on an ASTM standard viscosity-temperature chart. The viscosity-temperature slopes of various trimethyl end-blocked ethylmethylsiloxanes are shown by lines AB, CD, and IJ, while the viscosity-temperature slopes of corresponding trimethyl end-blocked dimethylsiloxanes are shown by lines EF, GH and KL. It can be seen that the slopes of the copolymers of this invention are equal to or superior to those of the dimethylcopolymers. A comparison of the freezing points of the present copolymers with trimethylsiloxanedimethylsiloxane copolymers is shown in Table I.

From the data given in this table it is readily seen that the copolymers of this invention extend the useful range of lubricants and damping media by more than 40° C., without loss of desirable temperature-viscosity properties.

For a better understanding of this invention, the following examples, which should be considered as illustrative only, are given.

EXAMPLES

Example 1

357 g. of $C_2H_5CH_3SiCl_2$ and 868 g. of $(CH_3)_3SiCl$ were combined and 885 g. of $H_2O$ was added slowly thereto with stirring. During the addition, the temperature was maintained below 20 C. by external cooling. This mixture was refluxed for 2 hours at 110° C. whereupon an acid layer and a product layer were formed. The acid layer was removed and the product layer was diluted with an equal volume of 5% NaOH. This mixture was heated for 2 hours at 88° C., with agitation, after which the heat was removed and agitation was continued for an additional two hours. Residual NaOH was then removed. The fluid product was washed with $H_2O$ until neutral, dried, and filtered. The filtered product was then fractionally distilled and the following compounds were obtained in the percentages indicated:

$(CH_3)_3SiOC_2H_5CH_3SiOSi(CH_3)_3$, 46.7%

$(CH_3)_3SiO[C_2H_5CH_3SiO]_2Si(CH_3)_3$, 26.5%

$(CH_3)_3SiO[C_2H_5CH_3SiO]_3Si(CH_3)_3$, 11.0% and a residue of $(CH_3)_3SiO[C_2H_5CH_3SiO]_xSi(CH_3)_3$, 15.8%

Example 2

This example illustrates the preparation of trimethyl end-blocked linear ethyl methyl siloxanes from mixed ethyl methyl cyclic siloxanes and $(CH_3)_3SiOSi(CH_3)_3$. 618 g. of mixed cyclic ethyl methyl siloxanes having the formula $[C_2H_5CH_3SiO]_x$ were combined with 1376 g. of $(CH_3)_3SiOSi(CH_3)_3$ and 200 g. of concentrated $H_2SO_4$ were added slowly to the mixture with stirring. During the addition, the temperature did not rise above 30° C. After addition of the $H_2SO_4$, the mixture was agitated for two hours at room temperature. An acid layer and a product layer formed and were separated. The product layer was washed until neutral, dried over $CaCl_2$, and filtered. The filtered liquid was then fractionally distilled and the following products were isolated in the proportions indicated:

$(CH_3)_3SiOC_2H_5CH_3SiOSi(CH_3)_3$, 43.5%
$(CH_3)_3SiO[C_2H_5CH_3SiO]_2Si(CH_3)_3$, 19.8%
$(CH_3)_3SiO[C_2H_5CH_3SiO]_3Si(CH_3)_3$, 7.7% and $(CH_3)_3SiO[C_2H_5CH_3SiO]_xSi(CH_3)_3$ residue 29.0%.

Representative trimethyl end-blocked ethylmethyl-siloxanes prepared and isolated as shown in Examples 1 and 2 are listed in the Table II.

Example 3

Ethyldimethyl end-blocked ethylmethylsiloxanes were prepared according to the method shown in Example 1 by cohydrolyzing ethyldimethylchlorosilane and ethylmethyldichlorosilane. The properties of some of the copolymers of this series are given in Table III.

TABLE I

| Total Number Silicon Atoms | Freezing Point, ° C. $(CH_3)_3SiO\left[\begin{matrix}CH_3\\SiO\\CH_3\end{matrix}\right]_nSi(CH_3)_3$ | Freezing Point, ° C. $(CH_3)_3SiO\left[\begin{matrix}CH_3\\SiO\\C_2H_5\end{matrix}\right]_nSi(CH_3)_3$ | Freezing Point, ° C. $C_2H_5(CH_3)_2SiO\left[\begin{matrix}CH_3\\SiO\\C_2H_5\end{matrix}\right]_nSi(CH_3)_2C_2H_5$ |
|---|---|---|---|
| 3 | −86 | below −120 | below −120 |
| 4 | −76 | below −120 | below −120 |
| 5 | −84 | below −120 | below −120 |
| 6 | −59 | below −120 | below −120 |
| >500 c. s. | −50 | below −120 | below −120 |

TABLE II

| Compound | Boiling Point, ° C. at 760 mm. | Refractive Index, $N_D^{20°}$ b. | Freezing Point, ° C. | Specific Gravity at 20° C. |
|---|---|---|---|---|
| $(CH_3)_3SiO\left[\begin{matrix}CH_3\\SiO\\C_2H_5\end{matrix}\right]Si(CH_3)_3$ | 173 | 1.3928 | below −120 | .830 |
| $(CH_3)_3SiO\left[\begin{matrix}CH_3\\SiO\\C_2H_5\end{matrix}\right]_2Si(CH_3)_3$ | 227 | 1.4019 | below −120 | .867 |
| $(CH_3)_3SiO\left[\begin{matrix}CH_3\\SiO\\C_2H_5\end{matrix}\right]_3Si(CH_3)_3$ | 263 | 1.4066 | below −120 | |
| $(CH_3)_3SiO\left[\begin{matrix}CH_3\\SiO\\C_2H_5\end{matrix}\right]_4Si(CH_3)_3$ | 311 | 1.4104 | below −120 | .906 |

TABLE III

| Compound | Boiling Point, ° C. at 760 mm. | Refractive Index, $N_D^{30°}$ C. | Freezing Point, ° C. | Specific Gravity at 20° C. |
|---|---|---|---|---|
| $[(CH_3)_2C_2H_5Si]_2O$ | 152 | 1.4000 | −120 | .798 |
| $(CH_3)_2C_2H_5SiO\left[\begin{matrix}CH_3\\SiO\\C_2H_5\end{matrix}\right]SiC_2H_5(CH_3)_2$ | 212 | 1.4075 | below −120 | .850 |
| $(CH_3)_2C_2H_5SiO\left[\begin{matrix}CH_3\\SiO\\C_2H_5\end{matrix}\right]_2SiC_2H_5(CH_3)_2$ | 259 | 1.4121 | below −120 | .880 |
| $(CH_3)_2C_2H_5SiO\left[\begin{matrix}CH_3\\SiO\\C_2H_5\end{matrix}\right]_3SiC_2H_5(CH_3)_2$ | 301 | 1.4150 | below −120 | .901 |
| $(CH_3)_2C_2H_5SiO\left[\begin{matrix}CH_3\\SiO\\C_2H_5\end{matrix}\right]_4SiC_2H_5(CH_3)_2$ | 364 | 1.4210 | below −120 | --------- |

That which is claimed is:

1.

$$(CH_3)_2RSiO\left[\begin{matrix}CH_3\\SiO\\C_2H_5\end{matrix}\right]_nSiR(CH_3)_2$$

where R is selected from the group consisting of methyl and ethyl radicals and n has a positive value.

2.

$$(CH_3)_2SiO\left[\begin{matrix}CH_3\\SiO\\C_2H_5\end{matrix}\right]_nSi(CH_3)_2$$

where n has a positive value.

3.

$$(CH_3)_2SiO\left[\begin{matrix}CH_3\\SiO\\C_2H_5\end{matrix}\right]_nSi(CH_3)_2$$

where n is an integer from 1 to 4 inclusive.

4.

$$(CH_3)_2C_2H_5SiO\left[\begin{matrix}CH_3\\SiO\\C_2H_5\end{matrix}\right]_nSiC_2H_5(CH_3)_2$$

where n has a positive value.

5.

$$(CH_3)_2C_2H_5SiO\left[\begin{matrix}CH_3\\SiO\\C_2H_5\end{matrix}\right]_nSiC_2H_5(CH_3)_2$$

where n is an integer from 1 to 4 inclusive.

ARTHUR J. BARRY.
JOHN W. GILKEY.

No references cited.